United States Patent
Tu et al.

(10) Patent No.: US 11,982,346 B2
(45) Date of Patent: May 14, 2024

(54) TERRAIN BASED DYNAMIC GEAR SHIFT CONTROL METHOD AND SYSTEM FOR VEHICLE

(71) Applicant: Xiamen Yaxon Network Co., Ltd., Fujian (CN)

(72) Inventors: Yankai Tu, Fujian (CN); Jianyun Qu, Fujian (CN); Tengyuan Luo, Fujian (CN); Gang Ji, Fujian (CN)

(73) Assignee: Xiamen Yaxon Network Co., Ltd., Fujian (CN)

( * ) Notice: Subject to any disclaimer, the term of this patent is extended or adjusted under 35 U.S.C. 154(b) by 0 days.

(21) Appl. No.: 18/250,793

(22) PCT Filed: Aug. 2, 2021

(86) PCT No.: PCT/CN2021/110045
§ 371 (c)(1),
(2) Date: Apr. 27, 2023

(87) PCT Pub. No.: WO2022/095522
PCT Pub. Date: May 12, 2022

(65) Prior Publication Data
US 2023/0392685 A1   Dec. 7, 2023

(30) Foreign Application Priority Data
Nov. 3, 2020   (CN) .......................... 202011210316.5

(51) Int. Cl.
*F16H 61/02*   (2006.01)
*F16H 59/18*   (2006.01)
(Continued)

(52) U.S. Cl.
CPC .......... *F16H 61/0213* (2013.01); *F16H 59/18* (2013.01); *F16H 59/44* (2013.01);
(Continued)

(58) Field of Classification Search
CPC .......... F16H 59/18; F16H 59/44; F16H 59/66; F16H 59/70; F16H 2059/663;
(Continued)

(56) References Cited

U.S. PATENT DOCUMENTS

2014/0095132 A1* 4/2014 Fu ........................... G06F 17/18
                                                                     703/6
2015/0345622 A1   12/2015 Sujan

FOREIGN PATENT DOCUMENTS

CN   102102756 A       6/2011
CN   102649433 A  *   8/2012   ......... B60W 40/076
(Continued)

OTHER PUBLICATIONS

International Search Report cited in PCT/CN2021/110045 dated Oct. 28, 2021, 6 pages.
(Continued)

*Primary Examiner* — Edwin A Young
(74) *Attorney, Agent, or Firm* — Cooper Legal Group, LLC

(57) ABSTRACT

The present disclosure discloses a terrain based dynamic gear shift control method and system for a vehicle. The method includes: during running of a vehicle, obtaining a current terrain; according to the current terrain, the economic gear shift strategy, and the dynamic gear shift strategy, generating a current gear shift strategy curve; and according to the current gear shift strategy curve, controlling a transmission to perform gear shift. The present disclosure can make the vehicle have wider adaptability, and achieve a better dynamic balance between economy and dynamic performance.

10 Claims, 2 Drawing Sheets

(51) Int. Cl.
*F16H 59/44* (2006.01)
*F16H 59/66* (2006.01)
*F16H 59/70* (2006.01)
*F16H 61/00* (2006.01)

(52) U.S. Cl.
CPC ............ *F16H 59/66* (2013.01); *F16H 59/70* (2013.01); *F16H 2059/663* (2013.01); *F16H 2061/0087* (2013.01); *F16H 2061/009* (2013.01); *F16H 2061/0223* (2013.01)

(58) Field of Classification Search
CPC ......... F16H 61/0213; F16H 2061/0087; F16H 2061/009; F16H 2061/0223
See application file for complete search history.

(56) References Cited

FOREIGN PATENT DOCUMENTS

| | | | |
|---|---|---|---|
| CN | 107100993 A | | 8/2017 |
| CN | 108361366 A | | 8/2018 |
| CN | 108382387 A | * | 8/2018 |
| CN | 108506474 A | | 9/2018 |
| CN | 109555847 A | | 4/2019 |
| CN | 111140651 A | | 5/2020 |
| JP | 2003517543 A | * | 5/2003 |

OTHER PUBLICATIONS

Written Opinion cited in PCT/CN2021/110045 dated Oct. 28, 2021, 3 pages.

* cited by examiner

TERRAIN BASED DYNAMIC GEAR SHIFT CONTROL METHOD AND SYSTEM FOR VEHICLE

TECHNICAL FIELD

The present disclosure relates to the technical field of vehicles, in particular to a terrain based dynamic control method and system for a vehicle.

BACKGROUND

In general, there are a plurality of gear shift schedules for automatic transmission of vehicles, most of which have ordinary gear shift schedules (D gears) and dynamic gear shift schedules (S gears), and some of which also have economic gear shift schedules (ECO gears). Economic gear shift is suitable for downhill roads, and dynamic gear shift is suitable for conditions with high power demands such as uphill roads or heavy loads. Existing gear shift schedules are generally fixed schedules that are manually selected by users. However, the users generally do not often manually select the gear shift schedules due to frequent changes in slopes of roads on which vehicles run, and thus several fixed gear shift schedules cannot adapt to all slopes of different sizes.

In a Chinese patent CN201710318736.7, it is proposed that an automatic gear shift control strategy for ramp conditions is developed according to the mass of a vehicle and a ramp, and by recognizing the mass, a rolling resistance coefficient, and an air resistance coefficient of the vehicle on a flat road, a calibration quantity and a known quantity are provided for recognizing the mass of the vehicle and a slope of the ramp during ramp driving, thereby improving the accuracy of recognizing the mass of the vehicle and the slope of the ramp; and gear shift correction control on the ramp is carried out according to the mass of the vehicle and the ramp, to avoid frequent gear shift on the ramp, thereby improving the gear shift smoothness and intelligent level of automatic transmission of the vehicle. Although the external environment has been considered, there is no substantial change in the internal gear shift schedule, and forced downshift or upshift is used; and moreover, only discrete slopes such as a gentle slope and a steep slope roughly correspond to several discrete gear shift strategies.

SUMMARY

To solve the technical problems in the prior art, the present disclosure provides a terrain based dynamic control method and system for a vehicle, which can generate a gear shift strategy curve in real time according to external terrain information, thereby making the vehicle have wider adaptability to different rugged terrains.

To solve the technical problems, the present disclosure adopts the following technical solutions: a terrain based dynamic gear shift control method for a vehicle includes presetting an economic gear shift strategy and a dynamic gear shift strategy, and further includes the following steps:

step 1): during running of a vehicle, acquiring current terrain information of the vehicle by an electronic horizon system;

step 2): performing, by a gear shift controller, dynamic interpolation fusion according to the current terrain information, the economic gear shift strategy, and the dynamic gear shift strategy, to generate a current gear shift strategy curve; and step 3): controlling, by the gear shift controller according to the current gear shift strategy curve, a transmission to perform gear shift.

As a preferred solution of the present disclosure, the step 2) specifically includes:

step 2.1): calculating a proportionality coefficient of the interpolation fusion according to the current terrain information; and step 2.2): generating the current gear shift strategy curve according to the proportionality coefficient of the interpolation fusion, a gear shift curve for a corresponding gear in the economic gear shift strategy, and a gear shift curve for a corresponding gear in the dynamic gear shift strategy.

As a preferred solution of the present disclosure, a downhill maximum M1 corresponding to an economic gear shift strategy curve and an uphill maximum M2 corresponding to a dynamic gear shift strategy curve are preset, and the proportionality coefficient of the interpolation fusion is $K=|M-M1|/|M2-M1|$, where M is a slope of the current terrain information.

As a preferred solution of the present disclosure, it is defined that $A=G_n(V)$ represents a gear shift curve for an $n^{th}$ gear in the economic gear shift strategy, $A=F_n(V)$ represents a gear shift curve for an $n^{th}$ gear in the dynamic gear shift strategy, $A=D_{M\_n}(V)$ represents a gear shift curve for an $n^{th}$ gear in the gear shift strategy curve generated under the slope M of the current terrain information, and an expression is as follows:

$$V=D^{-1}_{M\_n}(A)=(1-K)G^{-1}_n(A)+KF^{-1}_n(A) \quad (1)$$

where $F^{-1}_n(A)$ represents an inverse function of $F_n(V)$; $G^{-1}_n(A)$ represents an inverse function of $G_n(V)$; and $D^{-1}_{M\_n}(A)$ represents an inverse function of $D_{M\_n}(V)$, where $n=1, 2, \ldots, N$, N is the total number of gears of the transmission, A is an accelerator depth, and V is a vehicle speed of the vehicle.

As a preferred solution of the present disclosure, the step 3) specifically includes:

step 3.1): obtaining a current gear of the vehicle, and obtaining an upshift curve and a downshift curve for the current gear according to the current gear shift strategy curve;

step 3.2): calculating, according to a current accelerator depth of the vehicle, a vehicle speed for the upshift curve and the downshift curve, respectively, in combination with the expression (1) for the gear shift curve for the $n^{th}$ gear in the gear shift strategy curve; and step 3.3): comparing a current vehicle speed of the vehicle with the calculated vehicle speeds for the upshift curve and the downshift curve, and controlling, according to comparison results, whether the transmission performs gear shift.

As a preferred solution of the present disclosure, in the step 3.3), whether the current vehicle speed is higher than the vehicle speed for the upshift curve is determined first, and if the current vehicle speed is higher than the vehicle speed for the upshift curve, the transmission is controlled to perform upshift; and if the current vehicle speed is not higher than the vehicle speed for the upshift curve, whether the current vehicle speed is lower than the vehicle speed for the downshift curve is determined, if the current vehicle speed is lower than the vehicle speed for the downshift curve, the transmission is controlled to perform downshift, and if the current vehicle speed is not lower than the vehicle speed for the downshift curve, the current gear is maintained.

As a preferred solution of the present disclosure, each of gear shift curves for gears in the economic gear shift strategy and gear shift curves for gears in the dynamic gear shift strategy is a two-dimensional relationship curve for a vehicle speed and an accelerator depth.

As a preferred solution of the present disclosure, each of gear shift curves for gears in the economic gear shift strategy and gear shift curves for gears in the dynamic gear shift strategy is a three-dimensional relationship curve for a vehicle speed, an accelerator depth, and an acceleration.

A terrain based dynamic gear shift control system for a vehicle includes a gear shift controller in which an economic gear shift strategy and a dynamic gear shift strategy are preset, and a transmission, and further includes an electronic horizon module configured to, during running of a vehicle, acquire current terrain information of the vehicle, where the gear shift controller performs dynamic interpolation fusion according to the current terrain information, the economic gear shift strategy, and the dynamic gear shift strategy, to generate a current gear shift strategy curve, and controls, according to the current gear shift strategy curve, the transmission to perform gear shift.

As a preferred solution of the present disclosure, the gear shift controller further includes a gear shift module and a gear shift strategy curve generation module; the gear shift strategy curve generation module performs the dynamic interpolation fusion according to the current terrain information, the economical gear shift strategy, and the dynamic gear shift strategy, to generate the current gear shift strategy curve; and the gear shift module controls, according to the current gear shift strategy curve, the transmission to perform the gear shift.

Due to the use of the above technical solutions, compared with the prior art, the present disclosure has the following beneficial effects:

1. In the method and system according to the present disclosure, the dynamic interpolation fusion is performed according to the current terrain information of vehicle running, the economic gear shift strategy, and the dynamic gear shift strategy, to generate the current gear shift strategy curve, so that the vehicle has wider adaptability to different rugged terrains, and a better dynamic balance between economy and dynamic performance is achieved.
2. In the method and system according to the present disclosure, the proportionality coefficient of the interpolation fusion is calculated by a continuously changing geographic slope of a current terrain, and further the gear shift strategy curve is generated in combination with the economic gear shift strategy and the dynamic gear shift strategy, so that the continuous gear shift strategy curve may be obtained, thereby improving the smoothness of gear shift.
3. In the method and system according to the present disclosure, the vehicle speed for the upshift curve and the downshift curve is calculated, respectively, by combination of the current gear and the accelerator depth of the vehicle with the expression of the gear shift strategy curve, the calculated vehicle speeds are compared with the current vehicle speed, and whether the transmission performs gear shift is controlled according to comparison results, so that the driving performance of a driver may be improved, and the intelligent level of gear shift of the automatic transmission of the vehicle is improved.

DESCRIPTION OF EMBODIMENTS

The technical solutions of the present disclosure are described in detail below with reference to the accompanying drawings and the embodiments.

EMBODIMENTS

The present disclosure provides a terrain based dynamic gear shift control method for a vehicle. An economic gear shift strategy and a dynamic gear shift strategy are preset in a gear shift controller. Each of gear shift curves for gears in the economic gear shift strategy and gear shift curves for gears in the dynamic gear shift strategy is a two-dimensional relationship curve for a vehicle speed and an accelerator depth, and includes an upshift curve and a downshift curve. A built-in economic strategy curve is more inclined to a vertical axis of a curve coordinate space. In practical application, each of gear shift curves for gears in the economic gear shift strategy and gear shift curves for gears in the dynamic gear shift strategy may also be a three-parameter relationship curve for a vehicle speed, an accelerator depth, and an acceleration.

Figure 3:
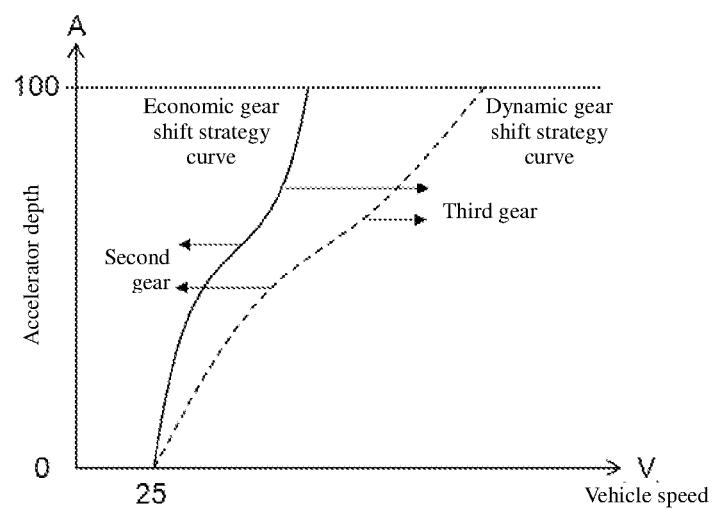
FIG. 3 is an upshift curve diagram of an economic gear shift strategy and a dynamic gear shift strategy according to the present disclosure.

Referring to an upshift curve diagram of the economic gear shift strategy and the dynamic gear shift strategy in FIG. 3, it is assumed that gear shift curves of a second gear and a third gear include two upshift curves, and under the same accelerator depth or opening, a vehicle speed for the second gear to the third gear in the economic gear shift strategy is lower than a vehicle speed for the second gear to the third gear in the dynamic gear shift strategy.

Figure 1:
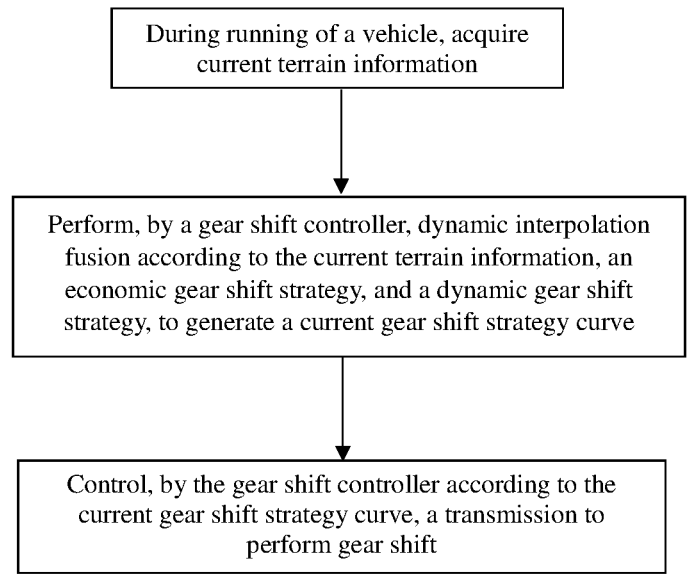
FIG. 1 is a flow chart of a method according to the present disclosure.
Figure 2:
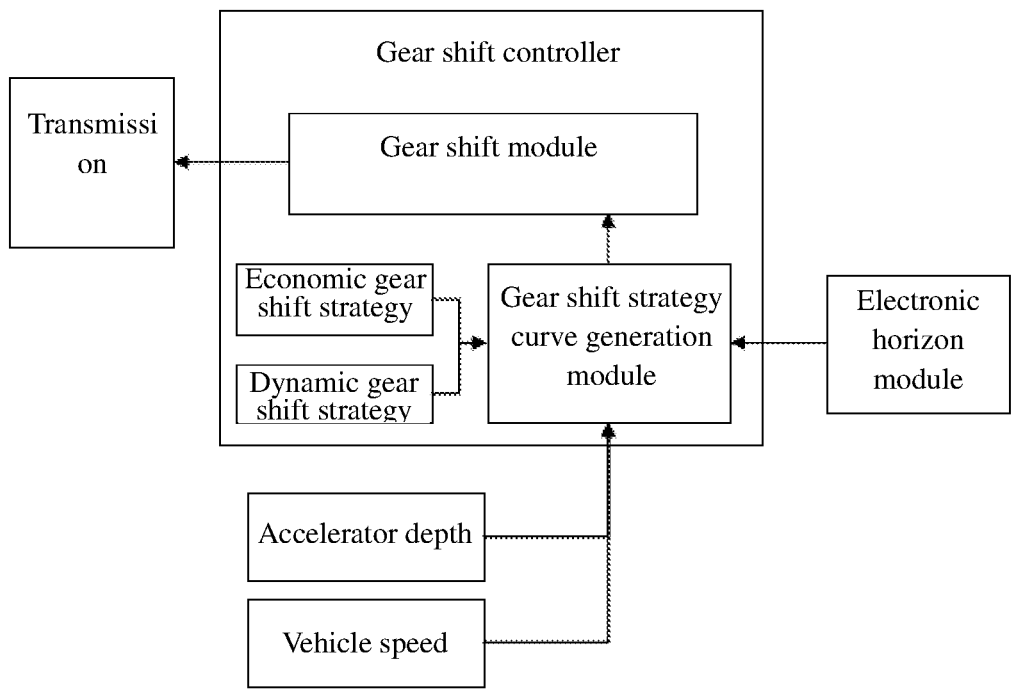
FIG. 2 is a diagram of a system according to the present disclosure.

As shown in FIG. 1, the method according to the present disclosure includes the following steps:

Step 1): during running of a vehicle, acquiring current terrain information of the vehicle. Specifically, a current terrain may be obtained by an electronic horizon, where the current terrain may include slope data, corner data, speed limit data, etc. In the embodiment provided by the present disclosure, it is preferable to obtain the slope data, that is, a slope M.

In the present disclosure, the electronic horizon includes map data, global positioning system (GPS)/Beidou positioning, and a forward search engine. It features that according to a longitude and latitude position of the vehicle analyzed by a GPS/Beidou satellite positioning system, and forward moving direction information of the vehicle, a map of the electronic horizon is searched for geographic information ahead of the vehicle, and the geographic information ahead of the vehicle is transmitted to the gear shift controller through a controller area network (CAN) bus or an Ethernet bus.

Step 2): performing, by a gear shift controller, dynamic interpolation fusion according to the current terrain information, the economic gear shift strategy, and the dynamic gear shift strategy, to generate a current gear shift strategy curve. This step specifically includes:

Step 2.1): calculating a proportionality coefficient of the interpolation fusion according to the current terrain information. Specifically, a downhill maximum M1 corresponding to an economic gear shift strategy curve and an uphill maximum M2 corresponding to a dynamic gear shift strategy curve are preset. For example, the downhill maximum M1 may be set to be a slope of −3°, and the uphill maximum M2 may be set to be a slope of +3°, so that the economic gear shift strategy should be used correspondingly when the downhill maximum is −3, and the dynamic gear shift strategy should be used correspondingly when the uphill maximum is +3. The proportionality coefficient of the interpolation fusion is K=M−M1|/|M2−M1|, where M is a slope of the current terrain information.

In the present disclosure, the calculation of the proportionality coefficient of the interpolation fusion is related to the obtained current terrain data, which is not limited to the slope and may also be other data.

Step 2.2): generating the current gear shift strategy curve according to the proportionality coefficient of the interpolation fusion, a gear shift curve for a corresponding gear in the economic gear shift strategy, and a gear shift curve for a corresponding gear in the dynamic gear shift strategy. In the present disclosure, if the economic gear shift strategy and the dynamic gear shift strategy are the two-dimensional relationship curves, the generated current gear shift strategy curve is also the two-dimensional relationship curve for the vehicle speed and the accelerator depth. In the present disclosure, if the economic gear shift strategy and the dynamic gear shift strategy are the three-parameter relationship curves, the generated current gear shift strategy curve is also the three-parameter relationship curve for the vehicle speed, the accelerator depth, and the acceleration. The gear shift strategy curve also includes the upshift curve and the downshift curve.

Specifically, if it is defined that $A=D_{M\_}n(V)$ represents a gear shift curve for an $n^{th}$ gear in the gear shift strategy curve generated under the slope M of the current terrain, an expression may be obtained as follows:

$$V=D^{-1}_{M\_}n(A)=(1-K)G^{-1}n(A)+KF^{-1}n(A) \quad (1)$$

The expression indicates that when the accelerator depth is A, the speed for the gear shift strategy curve is an interpolation of the two curves (in the economic gear shift strategy and the dynamic gear shift strategy) in a proportion of k.

In the expression, $A=Gn(V)$ represents a gear shift curve for an $n^{th}$ gear in the economic gear shift strategy, and $G^{-1}n(A)$ represents an inverse function of $Gn(V)$; $A=Fn(V)$ represents a gear shift curve for an $n^{th}$ gear in the dynamic gear shift strategy, and $F^{-1}n(A)$ represents an inverse function of $Fn(V)$; and $D^{-1}_{M\_}n(A)$ represents an inverse function of $D_{M\_}n(V)$, where n=1, 2, . . . , N, N is the total number of gears of the transmission, A is the accelerator depth, and V is the vehicle speed of the vehicle.

Step 3): controlling, by the gear shift controller according to the current gear shift strategy curve, a transmission to perform gear shift. This step specifically includes:

Step 3.1): obtaining a current gear of the vehicle, and obtaining an upshift curve and a downshift curve for the current gear according to the current gear shift strategy curve.

Step 3.2): calculating, according to a current accelerator depth of the vehicle, a vehicle speed for the upshift curve and the downshift curve, respectively, in combination with the expression (1) for the gear shift curve for the $n^{th}$ gear in the gear shift strategy curve, that is, substituting the current accelerator depth and the upshift curve of the current gear into the above expression (1), to obtain the vehicle speed for the upshift curve, and substituting the current accelerator depth and the downshift curve of the current gear into the above expression (1), to obtain the vehicle speed for the downshift curve.

Step 3.3): comparing a current vehicle speed of the vehicle with the calculated vehicle speeds for the upshift curve and the downshift curve, and controlling, according to comparison results, whether the transmission performs gear shift.

Specifically, whether the current vehicle speed is higher than the vehicle speed for the upshift curve is determined first, and if the current vehicle speed is higher than the vehicle speed for the upshift curve, the transmission is controlled to perform upshift; and if the current vehicle speed is not higher than the vehicle speed for the upshift curve, whether the current vehicle speed is lower than the vehicle speed for the downshift curve is determined, if the current vehicle speed is lower than the vehicle speed for the downshift curve, the transmission is controlled to perform downshift, and if the current vehicle speed is not lower than the vehicle speed for the downshift curve, the current gear is maintained.

The present disclosure further provides a terrain based dynamic gear shift control system for a vehicle, the system including a gear shift controller and a transmission. An economic gear shift strategy and a dynamic gear shift strategy are preset in the gear shift controller. The system further includes an electronic horizon module configured to, during running of a vehicle, acquire current terrain information of the vehicle, where the gear shift controller performs dynamic interpolation fusion according to the current terrain information, the economic gear shift strategy, and the dynamic gear shift strategy, to generate a current gear shift strategy curve, and controls, according to the current gear shift strategy curve, the transmission to perform gear shift.

In the present disclosure, the gear shift controller refers to one or more microprocessors that operate according to a preset program. The gear shift controller may receive the vehicle speed, the accelerator depth from an accelerator pedal, and the current terrain information from the electronic horizon module through the CAN bus or the Ethernet bus. The transmission is connected to the gear shift controller. An input torque of the transmission comes from a torque output by an engine. According to a command of the gear shift controller, the vehicle is controlled to run in a selected specific gear to output a drive torque to drive wheels.

The gear shift controller according to the present disclosure is provided with a gear shift module and a gear shift strategy curve generation module. The gear shift strategy curve generation module performs the dynamic interpolation fusion according to the current terrain information, the economical gear shift strategy, and the dynamic gear shift strategy, to generate the current gear shift strategy curve. The gear shift module controls, according to the current gear shift strategy curve, the transmission to perform the gear shift.

According to the present disclosure, for a continuously changing geographic slope of an ordinary road, intermediate interpolation transformation is performed using pre-stored fixed upshift and downshift strategies to generate a continuously changing gear shift strategy curve corresponding to an external slope in real time, thereby making the vehicle have wider adaptability to different rugged terrains, and achieving both dynamic performance and economy.

The above are only the preferred embodiments of the present disclosure and are not intended to limit the present disclosure in any form. Although the present disclosure has been disclosed with the preferred embodiments as above, the preferred embodiments are not intended to limit the present disclosure. Any of those skilled in the art may make many possible changes and modifications to the technical solutions of the present disclosure by using the technical content disclosed above, or modify them to equivalent embodiments without departing from the scope of the technical solutions of the present disclosure. Therefore, any simple amendments, equivalent changes and modifications made to the above embodiments according to the technical essence of the present disclosure without departing from the content of the technical solutions of the present disclosure fall within the scope of protection of the technical solutions of the present disclosure.

INDUSTRIAL APPLICABILITY

In a terrain based dynamic gear shift control method and system for a vehicle according to the present disclosure, current terrain information of vehicle running is acquired by using an electronic horizon system, a current gear shift strategy curve is generated according to the current terrain information of the electronic horizon system and in combination with preset economic gear shift strategy and dynamic gear shift strategy, and according to the current gear shift strategy curve, a transmission is controlled to perform gear shift, so that the vehicle has wider adaptability to different rugged terrains, and a better dynamic balance between economy and dynamic performance is achieved. The electronic horizon system is a database system that may provide the vehicle with accurate real-time information of roads, and the terrain information of the roads can be accurately acquired by the electronic horizon system; and the present disclosure is convenient to implement in industry with the aid of the electronic horizon system and a vehicle-mounted device, and various components such as the gear shift controller, the CAN bus, the Ethernet bus, and the transmission are also convenient to process in industry.

The invention claimed is:

1. A terrain based dynamic gear shift control method for a vehicle, comprising:
   presetting an economic gear shift strategy and a dynamic gear shift strategy, and further comprising the following steps:
   step 1): during running of the vehicle, acquiring current terrain information of the vehicle by an electronic horizon system;
   step 2): performing, by a gear shift controller, dynamic interpolation fusion according to the current terrain information, the economic gear shift strategy, and the dynamic gear shift strategy, to generate a current gear shift strategy curve; and
   step 3): controlling, by the gear shift controller according to the current gear shift strategy curve, a transmission to perform gear shift.

2. The terrain based dynamic gear shift control method for a vehicle according to claim 1, wherein the step 2) comprises:
   step 2.1): calculating a proportionality coefficient of the dynamic interpolation fusion according to the current terrain information; and
   step 2.2): generating the current gear shift strategy curve according to the proportionality coefficient of the dynamic interpolation fusion, a gear shift curve for a corresponding gear in the economic gear shift strategy, and a gear shift curve for a corresponding gear in the dynamic gear shift strategy.

3. The terrain based dynamic gear shift control method for a vehicle according to claim 2, wherein a downhill maximum M1 corresponding to an economic gear shift strategy curve and an uphill maximum M2 corresponding to a dynamic gear shift strategy curve are preset, and the proportionality coefficient of the dynamic interpolation fusion is $K=|M-M1|/|M2-M1|$, wherein M is a slope of the current terrain information.

4. The terrain based dynamic gear shift control method for a vehicle according to claim 3, wherein $A=Gn(V)$ represents a gear shift curve for an $n^{th}$ gear in the economic gear shift strategy, $A=Fn(V)$ represents a gear shift curve for an $n^{th}$ gear in the dynamic gear shift strategy, $A=D_{M\_}n(V)$ represents a gear shift curve for an $n^{th}$ gear in the current gear shift strategy curve generated under the slope M of the current terrain information, and an expression is as follows:

$$V=D^{-1}_{M\_}n(A)=(1-K)G^{-1}n(A)+KF^{-1}n(A) \qquad (1)$$

wherein $F^{-1}n(A)$ represents an inverse function of $Fn(V)$; $G^{-1}n(A)$ represents an inverse function of $Gn(V)$; and $D^{-1}_{M\_}n(A)$ represents an inverse function of $D_{M\_}n(V)$, wherein $n=1, 2, \ldots, N$, N is a total number of gears of the transmission, A is an accelerator depth, and V is a vehicle speed of the vehicle.

5. The terrain based dynamic gear shift control method for a vehicle according to claim 4, wherein the step 3) specifically comprises:
   step 3.1): obtaining a current gear of the vehicle, and obtaining an upshift curve and a downshift curve for the current gear according to the current gear shift strategy curve;
   step 3.2): calculating, according to a current accelerator depth of the vehicle, vehicle speeds for the upshift curve and the downshift curve, respectively, in combination with the expression (1) for the gear shift curve for the $n^{th}$ gear in the current gear shift strategy curve; and
   step 3.3): comparing a current vehicle speed of the vehicle with the vehicle speeds for the upshift curve and the downshift curve to yield comparison results, and controlling, according to the comparison results, whether the transmission performs gear shift.

6. The terrain based dynamic gear shift control method for a vehicle according to claim 5, wherein in the step 3.3), whether the current vehicle speed is higher than the vehicle speed for the upshift curve is determined first, and when the current vehicle speed is higher than the vehicle speed for the upshift curve, the transmission is controlled to perform upshift; and when the current vehicle speed is not higher than the vehicle speed for the upshift curve, whether the current vehicle speed is lower than the vehicle speed for the downshift curve is determined, when the current vehicle speed is lower than the vehicle speed for the downshift curve, the transmission is controlled to perform downshift, and when the current vehicle speed is not lower than the vehicle speed for the downshift curve, the current gear is maintained.

7. The terrain based dynamic gear shift control method for a vehicle according to claim 1, wherein each of gear shift curves for gears in the economic gear shift strategy and gear shift curves for gears in the dynamic gear shift strategy is a two-dimensional relationship curve for a vehicle speed and an accelerator depth.

8. The terrain based dynamic gear shift control method for a vehicle according to claim 1, wherein each of gear shift curves for gears in the economic gear shift strategy and gear shift curves for gears in the dynamic gear shift strategy is a three-dimensional relationship curve for a vehicle speed, an accelerator depth, and an acceleration.

9. A terrain based dynamic gear shift control system for a vehicle, comprising:
- a gear shift controller in which an economic gear shift strategy and a dynamic gear shift strategy are preset;
- a transmission; and
- an electronic horizon module configured to, during running of the vehicle, acquire current terrain information of the vehicle, wherein the gear shift controller performs dynamic interpolation fusion according to the current terrain information, the economic gear shift strategy, and the dynamic gear shift strategy, to generate a current gear shift strategy curve, and controls, according to the current gear shift strategy curve, the transmission to perform gear shift.

10. The terrain based dynamic gear shift control system for a vehicle according to claim 9, wherein the gear shift controller comprises a gear shift module and a gear shift strategy curve generation module; the gear shift strategy curve generation module performs the dynamic interpolation fusion according to the current terrain information, the economical gear shift strategy, and the dynamic gear shift strategy, to generate the current gear shift strategy curve; and the gear shift module controls, according to the current gear shift strategy curve, the transmission to perform the gear shift.

* * * * *